Figure 1:
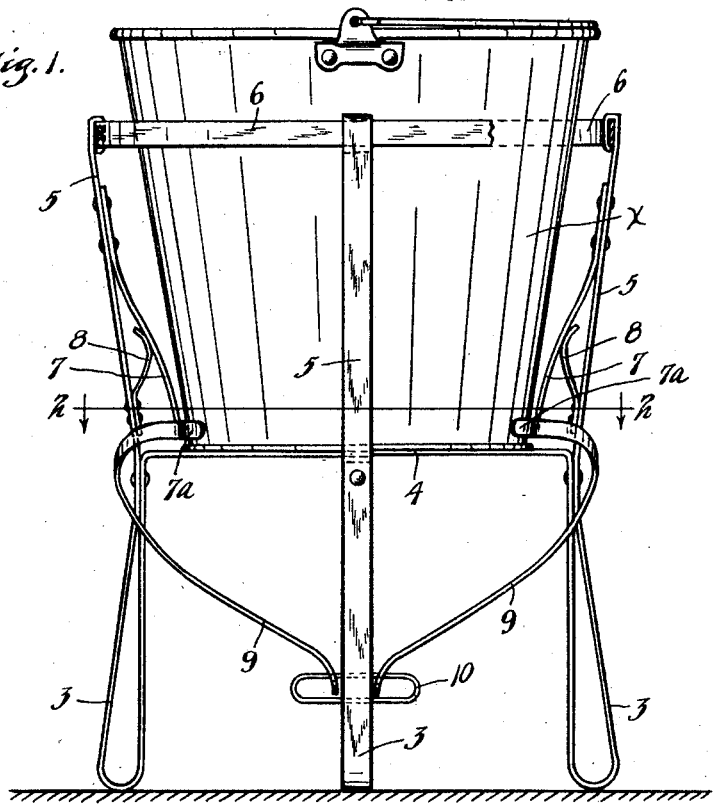

May 1, 1928.

A. P. HILL 1,667,785

MILK PAIL HOLDER

Filed April 4, 1927

INVENTOR.
A. P. HILL
BY HIS ATTORNEYS
Williamson Reif & Williamson

Patented May 1, 1928.

1,667,785

UNITED STATES PATENT OFFICE.

ALEXANDER P. HILL, OF HANCOCK, MINNESOTA.

MILK-PAIL HOLDER.

Application filed April 4, 1927. Serial No. 180,791.

This invention relates to devices for holding and supporting milk pails in proper position for milking.

It is the main object of this invention to provide an extremely simple but highly efficient milk pail holder and support adapted to securely hold the pail at the proper level for milking, and adapted to be connected to the pail in such a manner that it may be carried by said pail from place to place.

Another object of the invention is to provide a milk pail holder which will support and hold the pail in proper position for milking, which may be easily secured to the pail to be carried thereby, and which may be quickly released from the pail by simple mechanism controllable by the foot of the milker.

Figure 2:
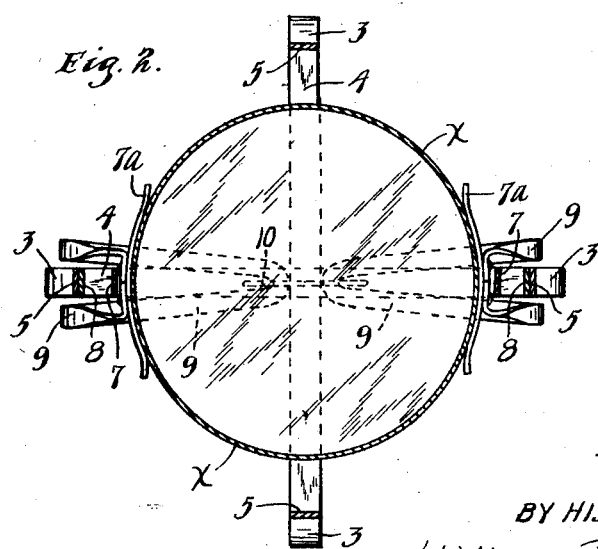

These and other objects of the invention will be apparent from the following description made in connection with the accompanying drawings wherein like reference characters refer to similar parts throughout the several views, and in which:

Fig. 1 is a front elevation of a preferred embodiment of the invention having a milk pail of standard type operatively disposed therein; and Fig. 2 is a cross section taken on the line 2—2 of Fig. 1.

My device may be made in various shapes and forms, but as illustrated is of skeleton construction formed from strip metal. As illustrated, the device is supported on four widely spread legs 3, which may be doubled or looped to provide the spider support 4, formed by the crossed horizontal portions of the strips. Circumferentially disposed upstanding arms 5 are provided which may be integral with the leg portions of the device. A guide ring or annular rail 6 is supported in horizontal position by arms 5 spaced some distance above the spider support 4 and substantially concentric therewith. It will be noticed that the ring 6 is of somewhat larger diameter than the spider support.

The pail X, of course, rests on support 4 and is supported by guide ring 6 and arms 5. Suitable mechanism for securing the pail to the support is provided in the form of a pair of depending spring clips 7 having arcuate shaped engaging heads 7ª adapted to contact the pail X above its lower bead or flange. Practically all milk pails are tapered somewhat from top to bottom and have a bead or flange at the bottom thereof. The clips 7 are preferably oppositely disposed on the frame work of the holder and as illustrated are secured at their upper ends to the upstanding arms 5 having their heads disposed slightly above the spider platform 4. A pair of upwardly extending leaf springs 8 are interposed between the free ends of clips 7 and the appropriate arms 5 of the frame yieldingly holding the free ends of said clips inwardly to contact pail X. It will be noticed that the arcuate heads 7ª of the clips are normally canted or inclined in such a manner as to permit the pail to be automatically cammed into engagement therewith, the lower bead or flange clipping past the heads to permit the bottom of the pail to rest on the support 4. An inwardly curved doubled treadle member 9 is rigidly attached to each clip preferably at the engaging head 7ª, said treadle members being oppositely disposed and having their free ends in close proximity beneath support 4 and in position to be easily engaged by the operator's foot. These treadle members preferably are not pivoted or mounted in any way on the frame of the device, but are suspended by the clips, as best shown in Fig. 1. A link 10 limits the outward movement of treadle members 9 and prevents the foot from slipping through.

In operation an ordinary milk pail of suitable size may be lowered within the frame guided by the ring 6. The clips 7ª will be automatically forced outwardly by the lower bead or flange of the pail permitting the bottom of the pail to rest on spider support 4 and the pail and holder will be locked together as soon as the heads 7ª of the clips take their position above said lower flange.

The device is now ready to be utilized and the holder may be carried from place to place by the bail of the pail.

When it is desired to remove the pail from the holder the operator merely extends a foot beneath platform 4 and presses downwardly against treadle arm 9, thereby swinging the free ends of clips 7 outwardly and releasing the engagement between said clips and the sides of the pail.

It will be seen that my device is a great convenience for dairymen, since the milking pail may be supported the proper height to receive milk without requiring any attention on the part of the operator, and since when partially filled the holder and support may be carried from place to place with the pail due to the connection therebetween. When the pail is filled the operator does not need to touch the holder or the sides of the pail with his hands, but may release the pail with his foot. The hands of the operator as well as the milk pail utilized may thus be always kept sanitary and clean where my device is used.

My device is simple in nature, comprises few parts and can be manufactured at little cost. Actual usage has shown the same highly efficient for the purposes enumerated.

It will, of course, be understood that various changes may be made in the form, details, proportions and arrangement of parts without departing from the scope of the invention.

What is claimed is:

1. A device of the class described comprising a frame having a wide spread base and a substantially horizontal support disposed above said base, a plurality of retaining means connected with said frame adapted to yieldingly engage the sides of a flanged container disposed on said support and depending means connected to said retaining means adapted to be manipulated by the foot for releasing said retaining means from engagement with said container.

2. A device of the class described comprising a frame having a wide spread base and a support disposed above said base and adapted to receive a container, means depending from said frame above said support for engaging the sides of said container to secure the same to said frame, means for impelling said retaining means inwardly to engage said container, and converging arms rigidly secured to said retaining means adapted to be depressed to release said retaining means from engagement with said container.

3. A device of the class described comprising an upright frame having a substantially horizontal support adapted to receive a container, a plurality of movable retaining members carried by said frame, means for yieldingly holding said retaining members inwardly against the sides of a container disposed within said frame, and a treadle mechanism connected to said retaining elements adapted to move said elements outwardly from engagement with said container.

4. A device of the class described comprising an upright frame having a substantially horizontal support adapted to receive a container, a plurality of movable retaining elements supported from said frame, means for impelling said retaining elements inwardly against a container disposed upon said support and depending, inwardly curved arms rigidly secured to said retaining means having their free ends disposed in close relation and adapted to be depressed to withdraw said retaining means from engagement with said container.

5. A device of the class described comprising an upright frame having a base and a substantially horizontal support adapted to receive a container and disposed above the level of its base depending swingable retaining means mounted on said frame adapted to engage the sides of a container, means for yieldingly impelling said retaining means inwardly, and depending treadle arms rigidly connected with said retaining means having their lower ends disposed in close relation and adapted to be depressed to release said retaining means from engagement with said container.

6. A device of the class described comprising a frame having a base and a support disposed above said base and adapted to receive a container, means depending from said frame above said support and yieldingly engaging the sides of said container to releasably secure the same to said frame, converging arms rigidly secured to said retaining means and having their lower extremities disposed in close relation, and a connection between said ends of said arms, said arms and said connection being adapted to be depressed to release said retaining means from said engagement with said container.

In testimony whereof I affix my signature.

ALEXANDER P. HILL.